(12) United States Patent
Kim et al.

(10) Patent No.: US 8,436,895 B2
(45) Date of Patent: May 7, 2013

(54) STEREOSCOPIC IMAGE DISPLAY DEVICE

(75) Inventors: Sin Young Kim, Daejeon (KR); Byoung Kun Jeon, Daejeon (KR); Moon Soo Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/247,737

(22) Filed: Sep. 28, 2011

(65) Prior Publication Data

US 2012/0162203 A1 Jun. 28, 2012

(30) Foreign Application Priority Data

Sep. 29, 2010 (KR) .................. 10-2010-0094605
Apr. 25, 2011 (KR) .................. 10-2011-0038226

(51) Int. Cl.
  *H04N 7/18* (2006.01)
(52) U.S. Cl.
  USPC .................. 348/57; 348/51; 348/58

(58) Field of Classification Search ............... 348/42–60
  See application file for complete search history.

(56) References Cited

U.S. PATENT DOCUMENTS

| | | | | |
|---|---|---|---|---|
| 4,884,876 A * | 12/1989 | Lipton et al. | .............. | 349/33 |
| 8,018,536 B2 * | 9/2011 | Hsu et al. | .............. | 349/15 |
| 8,062,836 B2 * | 11/2011 | Kim et al. | .............. | 430/321 |
| 2010/0007716 A1 * | 1/2010 | Lee et al. | .............. | 348/43 |
| 2010/0026795 A1 * | 2/2010 | Moller et al. | .............. | 348/56 |

* cited by examiner

*Primary Examiner* — Andy Rao
(74) *Attorney, Agent, or Firm* — McKenna Long & Aldridge, LLP

(57) ABSTRACT

Provided are a stereoscopic image display device and a method of manufacturing the same. The method of manufacturing a stereoscopic image display device and the stereoscopic image display device manufactured by the method may minimize a phenomenon capable of degrading a stereoscopic image quality such as crosstalk, have wide viewing angle and excellent contrast characteristics and realize excellent quality of the stereoscopic image.

16 Claims, 8 Drawing Sheets

STEREOSCOPIC IMAGE DISPLAY DEVICE

CROSS-REFERENCE TO RELATED APPLICATION

This application claims the priority of Korean Patent Application Nos. 10-2010-0094605 filed on Sep. 29, 2010 and 10-2011-0038226 filed on Apr. 25, 2011 in the Korean Intellectual Property Office, the disclosures of which are incorporated herein by reference for all purposes as if fully set forth herein

BACKGROUND

1. Field of the Invention

The present invention relates to a stereoscopic image display device and a method of manufacturing a stereoscopic image display.

2. Discussion of Related Art

A stereoscopic image display device is a display device that is capable of providing an observer with three-dimensional information of a subject to be displayed. Methods of displaying a stereoscopic image may be largely classified into glasses methods and glasses-free methods. Among these, the glasses methods may be classified into a polarized glasses method and an LC shutter glasses method, and the glasses-free methods may be classified into a binocular/multi view binocular disparity method, a volume-type method or a holographic method.

SUMMARY OF THE INVENTION

The present invention is directed to providing a stereoscopic image display device and a method of manufacturing a stereoscopic image display device.

One illustrative stereoscopic image display device may include a display element, a first polarizing plate and an optical filter. In the stereoscopic image display device, the display element, the first polarizing plate and the optical filter may be sequentially arranged along a direction along which image signals generated from the display element are transmitted in a driving state. Therefore, in the driving state, the image signals generated from the display element may progress toward the optical filter after passing through the first polarizing plate, and then be transmitted to an observer after passing through the optical filter.

In the driving state, the display element may generate image signals including an image signal for a left eye (hereinafter, referred to as an "L signal") and an image signal for a right eye (hereinafter, referred to as an "R signal") and then transmit the image signals to a side of an observer.

The first polarizing plate may be arranged in the side toward which the image signal from the display device is transmitted in the driving state, and includes an absorption axis.

The optical filter may include a first polarization modulating region (hereinafter simply referred to as a "first region") that is disposed in the side toward which the image signal after passing through the first polarizing plate is transmitted and that has an optical axis in a first direction, and a second polarization modulating region (hereinafter simply referred to as a "second region") that is also disposed in the side toward which the image signal after passing through the first polarizing plate is transmitted and that has an optical axis in a second direction that is different from the first direction.

In the display device, the optical filter and the first polarizing plate are arranged such that a bisector of an angle formed by the first and second directions may be perpendicular or parallel to the absorption axis of the first polarizing plate.

In one embodiment, the stereoscopic image display device may be a polarized glasses-type stereoscopic image display device in which the observer wears polarizing glasses in order to observe a stereoscopic image.

The terms used herein to define angles, for example, "vertical, horizontal, perpendicular or parallel," may include substantially vertical, horizontal, perpendicular or parallel respectively within a range without damaging a desired effect. For example, each term may include some error caused by various factors such as a manufacturing error and variation. For example, each term may include an error within approximately ±15 degrees, approximately ±10 degrees or approximately ±5 degrees.

Also, the term "the same, equal or equivalent" used to define a length, width, thickness or pitch, or used to explain a relationship between them may include substantially the same as each other without damaging a desired effect. For example, the term may include some error caused by various factors such as a manufacturing error and variation. For example, the term may include an error within approximately +60 μm, approximately ±40 μm or approximately +20 μm.

Also, the term "side of an observer or observer's side" or "side to which an image signal is transmitted" as used herein may refer to a direction along which the image signal generated from a display device progresses to the observer in the driving state.

The term "driving state" or "state in which a stereoscopic image is displayed" as used herein may refer to a state in which the stereoscopic display device is driven, and specifically, a stereoscopic image is displayed to the observer.

FIG. 1 is a diagram of the stereoscopic image display device. FIG. 1 illustrates a stereoscopic image display device observed from a direction of viewing a top of a head of an observer when the stereoscopic image display device 1 is observed from above, and specifically, provided that there is the observer viewing the device in the driving state.

The stereoscopic image display device 1 in FIG. 1 includes a display element 13 and a first polarizing plate 14 disposed in a direction to which an image signal emitted from the display element 13 is transmitted. The polarizing plate 14 is an optical element that includes a transmission axis and an absorption axis that is generally perpendicular to the transmission axis. If the image signals emitted from the display element 13 are input, the polarizing plate 14 may transmit only signals having the polarization axis parallel to the direction of the transmission axis among the image signals.

As in FIG. 1, the display device 1 may further include a second polarizing plate 12 that is disposed in a side of the display element 13 that is opposite to the first polarizing plate 14. In addition, the first and second polarizing plates 12 and 14 may have an absorption axis and a transmission axis, respectively, and the absorption axis of the first polarizing plate 14 and the absorption axis of the second polarizing plate 12 may be disposed to be perpendicular to each other. The transmission axes of the first and second polarizing plates 12 and 14 may also be formed to be perpendicular to each other.

As in FIG. 1, the display device 1 may further include a light source 11 disposed in a side of the second polarizing plate 12 that is opposite to the display element 13. In one embodiment, as the light source 11, a conventional direct-type or edge-type back light unit (BLU) that is generally used in a liquid crystal display device may be used. In addition to this light source, various kinds of light sources may be used without limitation.

In one embodiment, the display element 13 in FIG. 1 may be a transmissive liquid crystal display panel that may be formed by interposing a liquid crystal layer 132 between two substrates 131A and 131B. This type of the panel may sequentially include a substrate 131A, a pixel electrode, a first alignment layer, a liquid crystal layer 132, a second alignment layer, a common electrode and a substrate 131B. An active-type driving circuit including a thin film transistor as a driving device in electrical contact with a transparent pixel electrode and an interconnection may be formed on the substrate 131A that is disposed closer to the light source 11. A pixel electrode may include indium tin oxide (ITO) and serve as an electrode in each pixel. In addition, the first or second alignment layer may include, for example, a material such as polyimide. The liquid crystal layer 132 may include a vertical alignment (VA), twisted nematic (TN), super twisted nematic (STN) or in-plane switching (IPS) mode liquid crystals. The liquid crystal layer 132 may serve to transmit or block light by a pixel from the light source 11 according to a voltage applied from the driving circuit. The common electrode may include ITO and serve as a common counter electrode.

In the display element 13, at least one pixel capable of generating an L or R signal in a driving state may be formed. The pixel may be a unit pixel including a liquid crystal sealed between the alignment layers or a combination of at least two unit pixels. One or at least two unit pixels may form a region generating an image signal for a right eye (hereinafter, simply referred to as a "DR region" or "DR") and a region generating an image signal for a left eye (hereinafter, simply referred to as a "DL region" or "DL"). The DR and DL regions may be disposed in a column and/or row.

FIG. 2 is a diagram illustrating arrangement of the DR and DL regions. As in FIG. 2, the DR and DL regions may have a stripe shape extending in a common direction, and may be alternately disposed adjacent to each other. In addition, FIG. 3 illustrates a different arrangement, and the DR and DL regions are alternately disposed adjacent to each other in a lattice pattern. However, the arrangement of the DR and DL regions is not limited to the arrangements of FIGS. 2 and 3, and may be applied to various designs known in the art.

The display element 13 may generate an image signal including R and L signals by driving respective pixels according to signals in a driving state, and transmit the generated image signal to a side of the observer.

The light emitted from the light source 11 may be incident to the display element 13 through the first polarizing plate 12. The light passed through the DR region may be converted into an R signal and the light passed through the DL region may be converted into an L signal.

In FIG. 1, when the image signals including the R and L signals are incident, the first polarizing plate 14 transmits light having a polarizing axis parallel to the transmission axis of the polarizing plate 14.

The optical filter 15 is disposed on a side of the first polarizing plate 14 opposite to the display element 13, that is, on the observer's side of the polarizing plate 14. The image signal generated from the display element 13 and passed through the first polarizing plate 14 may be transmitted to the observer through the optical filter 15. The optical filter 15 may include, for example, a first region whose optical axis is formed in a first direction and a second region whose optical axis is formed in a second direction that is different from the first direction. The term "optical axis" as used herein may refer to a slow axis or fast axis in a process through which an image signal transmits a polarization modulating region.

Any one of the first and second regions may be a polarization modulating region for a right eye (hereinafter referred to as a "PR region" or simply "PR") for controlling a polarization state of the R signal input from the display element 13, and the other one thereof may be a polarization modulating region for a left eye (hereinafter referred to as a "PL region" or simply "PL") for controlling a polarization state of the L signal.

For convenience of the description, it is assumed that the first region is a PL region, and the second region is a PR region. However, the following description does not exclude the case in which the first region is a PR region, and the second region is a PL region.

In the optical filter 15, the PR region may be disposed for the R signal generated and transmitted from the DR region of the display element in a driving state to be entered, and the PL region may be disposed for the L signal generated and transmitted from the DL region of the display element to be entered.

In one embodiment, the PR and PL regions may be formed in a stripe shape extending in a common direction, and may be alternately disposed adjacent to each other, or may be alternately disposed adjacent to each other in a lattice pattern. FIG. 4 is a diagram illustrating an example of an optical filter in which PR and PL regions are alternately disposed adjacent to each other in a stripe shape, and FIG. 5 is a diagram illustrating an example of an optical filter in which PR and PL regions are disposed in a lattice pattern.

In FIGS. 4 and 5, a pitch of the PL or PR region and an interval of the PL or PR regions are not particularly limited, and may be determined according to their use. Here, the pitch of the PL or PR regions may mean a distance from a starting point of one PL or PR region to a starting point of another adjacent PL or PR region, for example, a length represented as P in FIGS. 4 and 5. In addition, the interval of the PL or PR regions may mean a distance from an ending point of one PL or PR region to a starting point of another adjacent PL or PR region, for example, a length represented as V in FIGS. 4 and 5. In one embodiment, the pitch of the PR or PL region may be twice a width of the DR or DL region of the display device. The stereoscopic image display device may include a display element in which the DL region (DL of FIG. 2 or 3) and DR region (DR of FIG. 2 or 3) are alternately disposed in a stripe shape or lattice pattern. Here, the pitch P may be twice the width of the DR or DL region, for example, a length represented as W1 or W2 in FIG. 2 or 3. In addition, the interval of the PR or PL region, for example, the length represented as V in FIG. 4 or 5, may be the same as the width of the DR or DL region in the display device, for example, the length represented as W1 or W2 in FIG. 2 or 3.

The pitch and interval are exemplary, and thus may be set to satisfy the relationship of the following General Formulas 4 and/or 5.

In the driving state, the image signal passed through the PR region and the image signal passed through the PL region may have different polarized states from each other.

For example, any one of the image signal passed through the PR region and the image signal passed through the PL region may be a left-circularly polarized image signal, and the other one may be a right-circularly polarized image signal. The R signal generated from the display element may be incident to the PR region through the first polarizing plate, and then emitted in a left- or right-circularly polarized state. The L signal may be incident to the PL region through the first polarizing plate, and then emitted in a right- or left-circularly polarized state to allow a polarization axis to rotate in an opposite direction to the R signal.

An optical filter capable of emitting the left- and right-circularly polarized image signals may include a λ/4 wavelength layer. In one embodiment, the optical filter may include λ/4 wavelength layers disposed in both the first and second regions. To generate circularly polarized lights rotating in opposite directions, an optical axis of the λ/4 wavelength layer disposed in the first region and an optical axis of the λ/4 wavelength layer disposed in the second region may be formed differently. In one embodiment, the first region may include a λ/4 wavelength layer having an optical axis in a first direction, and the second region may include a λ/4 wavelength layer having an optical axis in a second direction different from the first direction. In addition, the term "λ/4 wavelength layer" as used herein may refer to a phase retardation device capable of retarding a phase of the incident light by ¼ of each wavelength.

However, an aspect of the optical filter is not limited to the above-mentioned filter. For example, in case where one of the first and second regions of the optical filter includes a 3λ/4 wavelength layer, and the other one includes a λ/4 wavelength layer, the left- and right-circularly polarized light may be generated. The term "3λ/4 wavelength layer" as used herein may refer to a phase retardation device capable of retarding a phase of the incident light by ¾ of each wavelength. Such a device may be manufactured by stacking a λ/2 wavelength layer, which is a phase retardation device capable of retarding a phase of the incident light by ½ of each wavelength, and a λ/4 wavelength layer.

FIG. 6 is a schematic diagram illustrating directions of the optical axes of the PR and PL regions of the optical filter shown in FIG. 4 or 5. In FIG. 6, the optical axis formed in the first direction in the PL region is represented as A1, and the optical axis formed in the second direction in the PR region is represented as A2.

The optical axes A1 and A2 of the PR and PL regions may be formed so that a bisector of the angle formed by the optical axes A1 and A2 of the PR and PL regions may be parallel or perpendicular to the absorption axis of the first polarizing plate. According to such arrangement of the optical axis, the image signal generated from the display element and passed through the polarizing plate may be precisely converted into left- and right-circularly polarized lights. Accordingly, an excellent stereoscopic image quality may be realized, and a crosstalk phenomenon caused during observation of a stereoscopic image may be prevented. Referring to FIG. 6, the term "a bisector of the angle formed by the optical axes" may refer to a line bisecting an angle of "θ1+θ2" or "360−(θ1+θ2)." For example, if θ1 and θ2 are the same angles, the bisector may be formed parallel to a boundary line L between the PR and PL regions.

The optical axes A1 and A2 of the PR and PL regions may be perpendicular to each other. Such a state, for example, may mean that the angle of "θ1+θ2" or "360−(θ1+θ2)" is substantially 90 degrees in FIG. 6. According to the above-mentioned arrangement of the optical axes, excellent stereoscopic image qualities such as a viewing angle and a contrast ratio may be realized, and the crosstalk phenomenon may be prevented.

The exemplary optical filter may further include a substrate, and a phase retardation layer such as the λ/4 wavelength layer may be formed on the substrate. In this case, the λ/4 wavelength layer may be disposed on the side of the display element, and the substrate may be disposed on the side of the observer. The substrate may be a conventional glass or plastic substrate known in the art. As a plastic substrate, a light transmissive substrate, for example, a plastic substrate having transmittance with respect to visible light of approximately 80% or more, or approximately 85% or more, may be used. If the plastic substrate is used, a display device having a smaller thickness and a lighter weight may be more easily manufactured.

The plastic substrate may be optically isotropic or anisotropic. If the substrate is optically anisotropic, the substrate may have a (−) C plate characteristic. The term "(−) C plate characteristic" as used herein may refer to a characteristic satisfying the relationship of the following General Formula 1.

$$N_x, N_y > N_z \qquad \text{[General Formula 1]}$$

In General Formula 1, $N_x$ is a refractive index in an in-plane slow axis direction of the substrate, $N_y$ is a refractive index in an in-plane fast axis direction of the substrate, and $N_z$ is a refractive index in a thickness direction of the substrate. Here, each refractive index may be a refractive index with respect to light having a wavelength of approximately 550 or 589 nm.

A method of measuring the refractive index ($N_x$, $N_y$ or $N_z$) of the substrate is widely known in the art, and one of ordinary skill in the art may easily measure the refractive index of the substrate according to the known method.

In another embodiment, the substrate may have an in plane phase retardation value ($R_{in}$) of −50 to 50 nm, −30 to 30 nm, or −15 to 15 nm. In addition, the substrate may have a phase retardation ($R_{th}$) in a thickness direction of −70 to 70 nm, −50 to 50 nm or −30 to 30 nm.

In the above, the phase retardation ($R_{th}$) in a thickness direction may be calculated according to the following General Formula 2, and the in plane phase retardation ($R_{in}$) may be calculated according to the following General Formula 3.

$$R_{th} = d \times (N_z - N_y) \qquad \text{[General Formula 2]}$$

$$R_{in} = d \times (N_x - N_y) \qquad \text{[General Formula 3]}$$

In General Formulas 2 and 3. $N_x$, $N_y$ and $N_z$ are the same as defined in General Formula 1, and d indicates a thickness of the substrate.

If the substrate is optically anisotropic, the optical axis, for example, a slow axis, of the substrate may be formed perpendicular or parallel to the above-mentioned boundary line of the PR and PL regions or the bisector of the angle formed by the optical axes (A1 and A2) of the PR and PL regions. Due to such arrangement, a device having an excellent display quality and preventing a crosstalk phenomenon may be provided.

In addition, the substrate may have a lower refractive index than the phase retardation layer such as the λ/4 wavelength layer, and particularly a refractive index of approximately 1.33 to 1.53. When the substrate has a lower refractive index than the λ/4 wavelength layer, a brightness improving effect may be obtained, and is advantageous in an aspect of prevention of reflection and a contrast ratio.

Using the substrate having the above-mentioned optical characteristics, light dividing efficiency due to an optical filter may be optimized, and a quality of displaying a stereoscopic image may be improved.

Examples of the plastic substrate may include a cellulose substrate formed of, for example, triacetyl cellulose (TAC) or diacetyl cellulose (DAC); a cyclo olefin polymer (COP) substrate formed of, for example, a norbornene derivative; an acryl substrate formed of, for example, poly(methyl methacrylate) (PMMA); a polycarbonate (PC) substrate; a polyolefin substrate formed of, for example, polyethylene (PE) or polypropylene (PP); a polyvinyl alcohol (PVA) substrate; a polyethersulfone (PES) substrate; a polyetheretherketone (PEEK) substrate; a polyetherimide (PEI) substrate; a polyethylenenaphthalate (PEN) substrate; a polyester substrate formed of for example, polyethyleneterephthalate (PET); a polyimide (PI) substrate; a polysulfone (PSF) substrate; or a fluorine polymer substrate formed of, for example, an amorphous fluorine resin. In one embodiment, a cellulose substrate such as a TAC substrate may be used.

The substrate may have a monolayer structure or a multilayer structure, but it is preferable that the substrate have a monolayer structure in an aspect of providing a device having a smaller thickness.

The substrate may include a UV blocking agent or UV absorbent. When the substrate includes an appropriate amount of the UV blocking agent or absorbent, deterioration of the optical filter due to UV rays may be prevented, and durability of the device may be ensured. The UV blocking agent or absorbent may be a salicylic acid ester-, benzophenone-, oxybenzophenone-, benzotriazol-, cyanoacrylate- or benzoate-based organic compound, or an inorganic compound such as zinc oxide or a nickel complex salt, and preferably an organic-based material.

A content of the UV protector or absorbent in the substrate is not particularly limited, and may be appropriately selected in consideration of a desired effect. For example, in the manufacture of the substrate, the UV protector or absorbent may be included in a content of approximately 0.1 to 25 wt % in a weight ratio with respect to a main material of the substrate.

A thickness of the substrate is not particularly limited, but may be appropriately adjusted according to the desired use.

In one embodiment, the phase retardation layer such as the $\lambda$/wavelength layer which may be formed on the substrate may include an alignment layer formed on the substrate and a liquid crystal layer formed on the alignment layer. The liquid crystal layer may be, for example, a $\lambda/4$ wavelength layer in which an optical axis is formed in a different direction in each region, and the alignment layer under the liquid crystal layer may serve to control the optical axis of the wavelength layer. The alignment layer may be a conventional alignment layer known in the art. As the alignment layer, a photo alignment layer capable of determining alignment due to cis-trans isomerization, fries rearrangement or dimerization induced by irradiating linearly polarized light and inducing alignment of an adjacent liquid crystal layer due to the determined alignment, or a polymer layer such as a rubbing-treated polyimide layer or an acryl curable resin layer formed by patterning a plurality of groove regions may be used.

The liquid crystal layer may be a photocrosslinking layer or photopolymerization layer of a photocrosslinkable or photopolymerizable liquid crystal compound, which is known in the art. Various liquid crystal compounds exhibiting the above characteristics are known in the art, and an example of the liquid crystal compound may be reactive mesogen produced by Merk, or LC242 produced by BASF.

A method of manufacturing an optical filter is not particularly limited. Various methods of manufacturing an optical filter are known in the art, and all of the known methods may be applied in consideration of the relationship between the absorption axis of the polarizing plate and the optical axis of the optical filter.

The display element and the optical filter in the exemplary display device may satisfy the relationship of the following General Formula 4.

$$A < B - (2/3) \times c \qquad \text{[General Formula 4]}$$

In General Formula 4, A is a length of the optical filter, B is a length of the display element, and C is an interval between the optical filter and the display device.

In the conventional stereoscopic image display device, PR and PL regions of the optical filter corresponding to DR and DL regions of the display element are designed to have precisely the same sizes, respectively. Accordingly, in the conventional device, the display element and the optical filter have substantially the same size. In the specification, the PR and PL regions of the optical filter corresponding to respective image signal generating regions may refer to a PR region to which an R signal generated in a certain DR region is intended to be incident or a PL region to which an L signal generated in a certain DL region is intended to be incident.

However, in one embodiment of the device, a size of the optical filter may be controlled to be different from that of the display element, for example, and may be controlled to satisfy the relationship of General Formula 4. As the sizes of the display element and the optical filter are controlled to satisfy the relationship of General Formula 4, crosstalk may be prevented, a viewing angle may be widened, and an observer may observe a stereoscopic image having more excellent quality.

In General Formula 4, A is a length of the optical filter, and particularly, a length in a horizontal or vertical direction based on the observer observing the stereoscopic image in the driving state. In addition, in General Formula 4, B is a length of the display element, and particularly, a length in a horizontal or vertical direction based on the observer observing the stereoscopic image in the driving state.

In addition, in General Formula 4, "c" is an interval between the optical filter and the display element in the stereoscopic image display device. For example, when the stereoscopic image display device includes a liquid crystal panel as shown in FIG. 1 as the display device, the interval may be an interval between a surface of the liquid crystal layer facing the optical filter in the display element and a surface of the optical filter facing the liquid crystal layer. In addition, when the display element includes a color filter, "c" may be a distance between the liquid crystal layer and a surface facing the optical filter, or a distance between a surface of the color filter facing the optical filter and a surface of the optical filter facing the color filter.

FIG. 7 is a diagram only illustrating the display element 13 and the optical filter 15 in the device of FIG. 1. In FIG. 7, the "A," and of the device of FIG. 1 are shown. In FIG. 7, a direction of observing the stereoscopic image display device is the same as in FIG. 1. That is, in FIG. 7, A and B are horizontal lengths of the optical filter and the display device, respectively, but the description with reference to FIG. 7 may also be applied to the case when the lengths are vertical lengths thereof.

In the stereoscopic image display device, central lines of the display device and the optical filter may correspond to each other. The term "central line" may mean a line bisecting a device such as the display element or optical filter in a horizontal or vertical direction. Here, the horizontal or vertical direction is determined based on the observer observing a stereoscopic image in the driving state. Referring to FIG. 7, the central line of the display element and the central line of the optical filter are matched to each other along a line Q when seen from above.

As the display device and the optical filter are designed to satisfy the relationship of General Formula 4, a crosstalk phenomenon occurring when an L signal is incident to a right eye or an R signal is incident to a left eye may be prevented, and a wide angle and an excellent contrast ratio may be secured, thereby maintaining the excellent quality of the stereoscopic image.

In the exemplary stereoscopic image display device, the display element and the optical filter satisfy the relationship of General Formula 4, and are disposed so that the R and L signals that are transmitted to the display element in the driving state can be incident to the PR region of the optical filter and the PL region of the optical filter, respectively. For example, when the DR and DL regions of the display device are formed in a stripe shape as shown in FIG. 2, the PR and PL regions of the optical filter may also be formed in a corresponding stripe pattern as shown in FIG. 4. When the DR and DL regions of the display device are formed in a lattice pattern as shown in FIG. 3, the PR and PL regions of the optical filter may also be formed in a corresponding lattice pattern as shown in FIG. 5.

In the exemplary device, the image signal generating region of the display device and the polarization modulating region of the optical filter may satisfy the relationship of the following General Formula 5.

The display device may satisfy both the relationship of General Formula 4 and the relationship of General Formula 5, but a case in which the display device satisfies only one of these relationships is not excluded.

$$E \times (1-(2c)/(3B))=F \quad \text{[General Formula 5]}$$

In General Formula 5, E is a distance from the central line of the display element to the DR or DL region. F is a distance from the central line of the optical filter to the PR or PL region corresponding to the region of the distance E, and B and c are the same as defined in General Formula 4.

In General Formula 5, "$E \times (1-(2c)/(3B))$" and F have the same values, and here, the same value means substantially the same value including, for example, manufacturing error as described above.

As the relationship between the image signal generating region and the polarization modulating region is modulated to satisfy the relationship, quality improvement effects of the stereoscopic image display device including the prevention of the crosstalk and the securement of the viewing angle may be optimized.

Here, the central line means a line bisecting the device in a horizontal or vertical direction as described above.

Here, E is a distance from the central line of the element to the DR or DL region, and specifically, a distance in a horizontal or vertical direction based on the observer observing a stereoscopic image in the driving state, or a distance from the central line to a starting point of a corresponding image signal generating region.

FIG. 8 is a diagram illustrating only the display element and the optical filter 15 of the device of FIG. 1, which is similar to FIG. 7. In FIG. 8, a direction of observing the stereoscopic image display device is the same as that in FIG. 1. That is, while EL1, EL2, ER2, FL1, FL2 and FR2 shown in FIG. 8 represent lengths in a horizontal direction, the description with reference to FIG. 8 may also be applied to the case when the length is a vertical length.

Referring to FIG. 8, a distance from the central line disposed on the line Q to the DL region formed first on the right side is represented as EL1, and a distance to the DL region formed second is represented as EL2. In addition, a distance from the central line to the DR region formed first on the right side is 0, and a distance to the DR region formed second is represented as ER2.

In addition, F is a distance from the central line of the optical filter to a PR or PL region corresponding to the image signal generating region having a distance of E. Here, the PR or PL region corresponding to the image signal generating region having the distance of E may mean a PR or PL region to which an image signal generated from the image signal generating region having the distance of E is intended to be incident. The distance of E is a distance in a horizontal or vertical direction based on the observer observing a stereoscopic image in the driving state, and also a distance from the central line to a starting point of a corresponding region.

Referring to FIG. 8, a distance from the central line disposed in the line Q to the PL region corresponding to the DL region (distance EL1) formed first on the right side is represented as FL1, and a distance to the PL region corresponding to the DL region (distance EL2) formed second is represented as FL2. In addition, a distance from the central line to the PR region corresponding to the DR region formed first on the right side is 0, and a distance to the PR region corresponding to the DR region (distance EL2) formed second is represented as FR2.

While the relationship between the distances of the regions present on the right side based on the central line has been described, such a relationship may be applied in the same manner to the regions present on the left side based on the central line.

Due to the above arrangement, the R and L signals may be effectively transmitted to the observer via the corresponding polarization modulating regions.

While the major devices of the stereoscopic image display device have been described, the display device may further include various devices used in the stereoscopic image display device, for example, polarizing glasses, in addition to the above-mentioned devices. In this case, specific kinds of additional devices are not particularly limited.

A exemplary method of manufacturing the stereoscopic image display device may include sequentially arranging a display element capable of generating an image signal including R and L signals; a polarizing plate having an absorption axis; and an optical filter having a first region whose optical axis is formed in a first direction and a second region whose optical axis is formed in a second direction different from the first direction.

Here, a line bisecting an angle formed by the first and second directions may be disposed perpendicular or parallel to the absorption axis of the polarizing plate.

The manufacturing method may be the above-mentioned method of manufacturing a stereoscopic image display device, and thus the method may be performed using the same kinds of display device, polarizing plate and optical filter described above. A specific aspect of the manufacturing method is not particularly limited when being performed to satisfy the relationship of the absorption axis of the polarizing plate and the bisector of the optical axes. For example, according to the known method, the components of the device may be accommodated in a suitable housing.

In the above method, the display device and the optical filter may be arranged to satisfy the relationship of General Formula 4 described above. The display device and the optical filter may be arranged in such a manner that an R signal transmitted from the display device is incident to any one of the first and second regions of the optical filter, and an L signal transmitted from the display device is incident to the other region in a driving state. Therefore, the display device and the optical filter may be arranged to satisfy the relationship of General Formula 5 described above.

Other factors of the method of manufacturing a stereoscopic image display device not mentioned above are not particularly limited, and contents known in the art may be suitably selected and performed without departing from a desired effect.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, the device will be described in detail with respect to Examples according to the present invention and Comparative Examples not according to the present invention, but the scope of the present invention is not limited thereto.

In the specification, a crosstalk ratio was evaluated by the following method.

1. Method of Evaluating Crosstalk Ratio

A crosstalk ratio may be defined as a ratio of brightness in a dark state to that in a bright state. According to a type of stereoscopic image display device, various methods of measuring a crosstalk ratio are known in the art. For example, in Examples in which a polarized glasses-type stereoscopic image display device is used, a crosstalk ratio may be measured by the following method. First, polarized glasses for observing a stereoscopic image are placed at a conventional observatory point of a stereoscopic image display device. Here, the conventional observatory point is a point where it is 3/2 times as long as the horizontal length of the stereoscopic image display device away from the center of the stereoscopic image display device. At this position, the polarized glasses are placed on the assumption that the observer observes the center of the display device. The horizontal length of the stereoscopic image device may be a length in a horizontal direction based on the observer on the assumption that the observer observes a stereoscopic image. For example, the horizontal length of the image display device may be a breadthwise length of the device. In the above arrangement, under the state where the device emits the L signal, a brightness measuring meter (name: SR-UL2 Spectrometer) is arranged on back surfaces of lenses for left and right eyes of the polarized glasses respectively, and then a brightness is measured. Here, the brightness measured on the back surface of the lens for the left eye is the brightness in a bright state, and the brightness measured on the back surface of the lens for the right eye is the brightness in a dark state. After the brightness is measured, a percentage of a ratio of the brightness in the bright state to the brightness in the dark state ([Brightness in the dark state]/[Brightness in the bright state]) may be measured, thereby defining as the crosstalk ratio. The crosstalk ratio may also be measured by the same method described above, and specifically, by measuring brightness in the bright and dark states when the display device emits the R signal. In this case, the brightness measured on the back surface of the lens for the left eye is the brightness in a dark state, and the brightness measured on the back surface of the lens for the right eye is the brightness in a bright state.

Example 1

Figure 1:
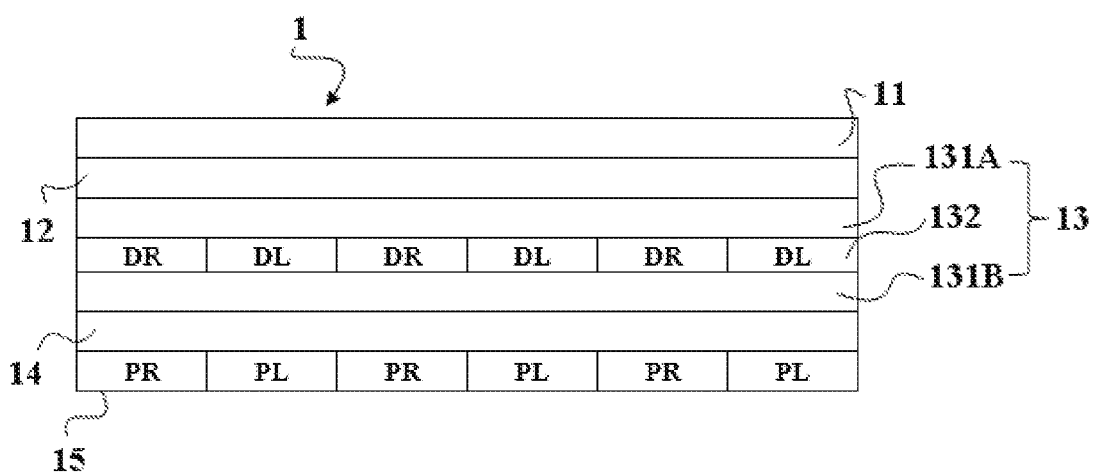
FIG. 1 is a schematic diagram of an exemplary stereoscopic image display device.
Figure 2:
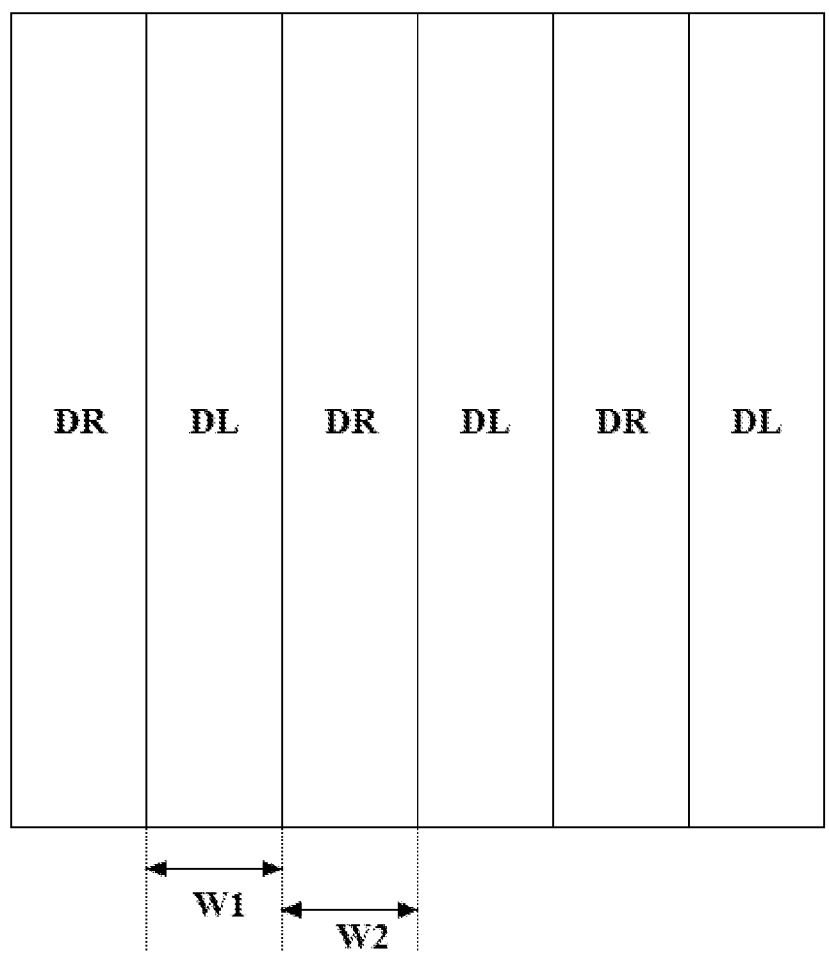
FIGS. 2 and 3 are schematic diagrams of exemplary arrangements of DR and DL regions.
Figure 3:
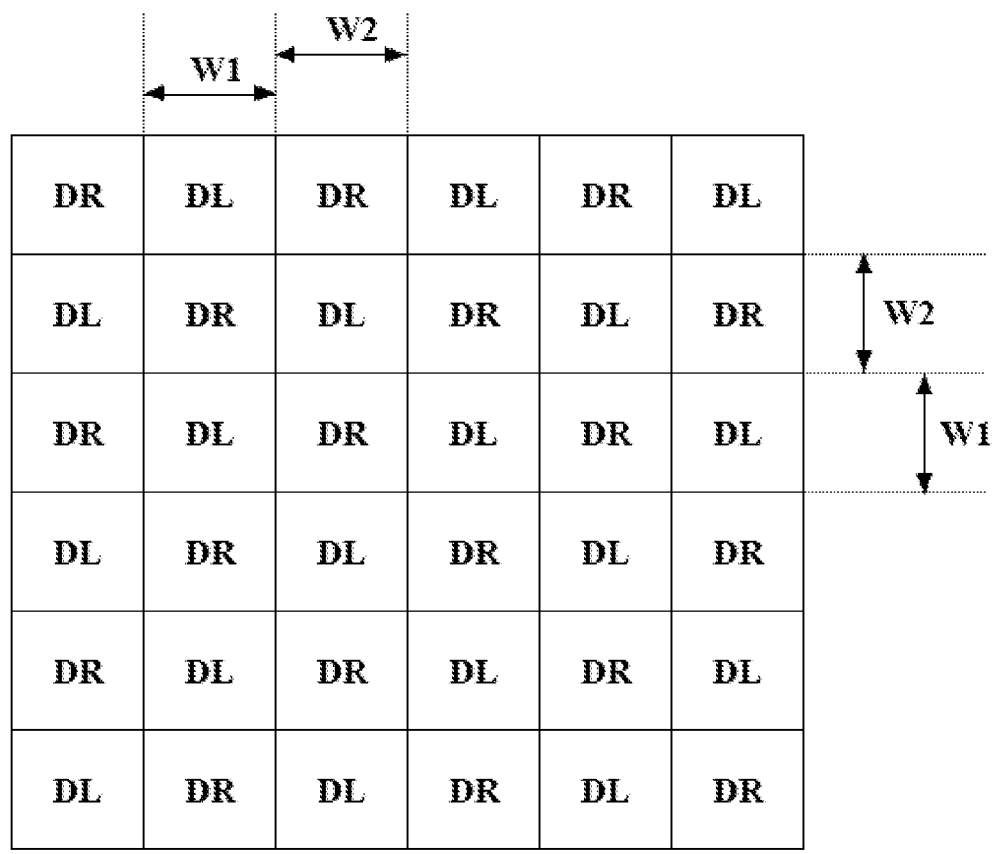
Figure 4:
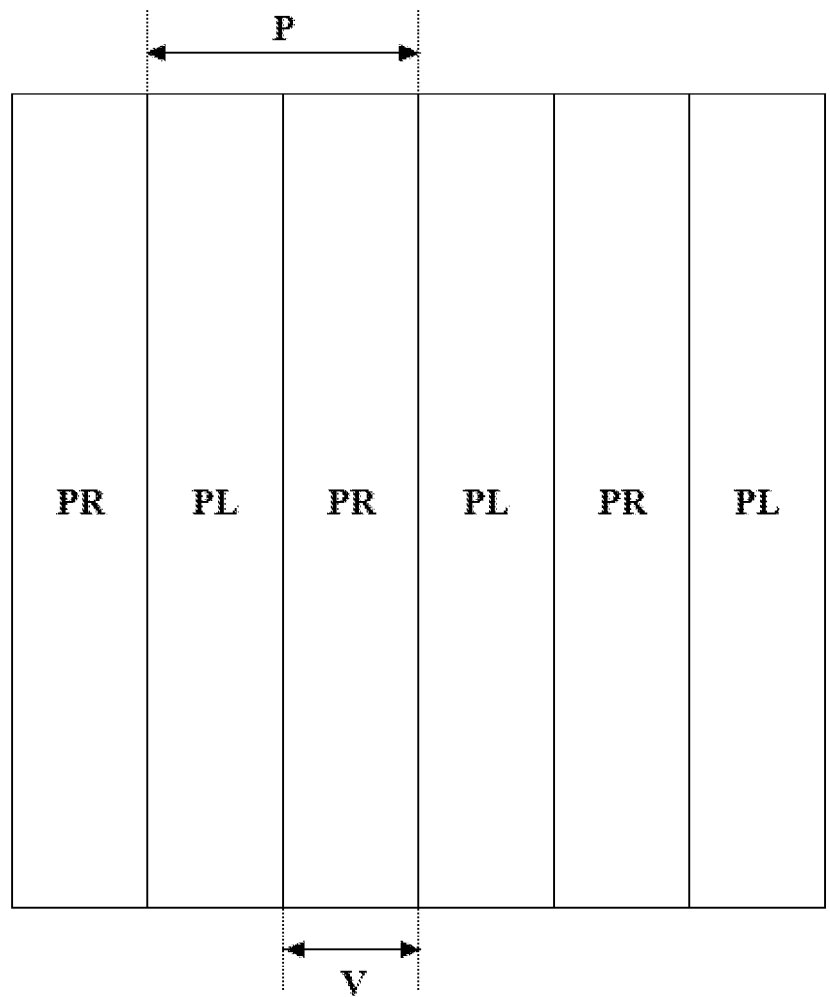
FIGS. 4 and 5 are schematic diagrams of exemplary arrangements of PR and PL regions.
Figure 5:
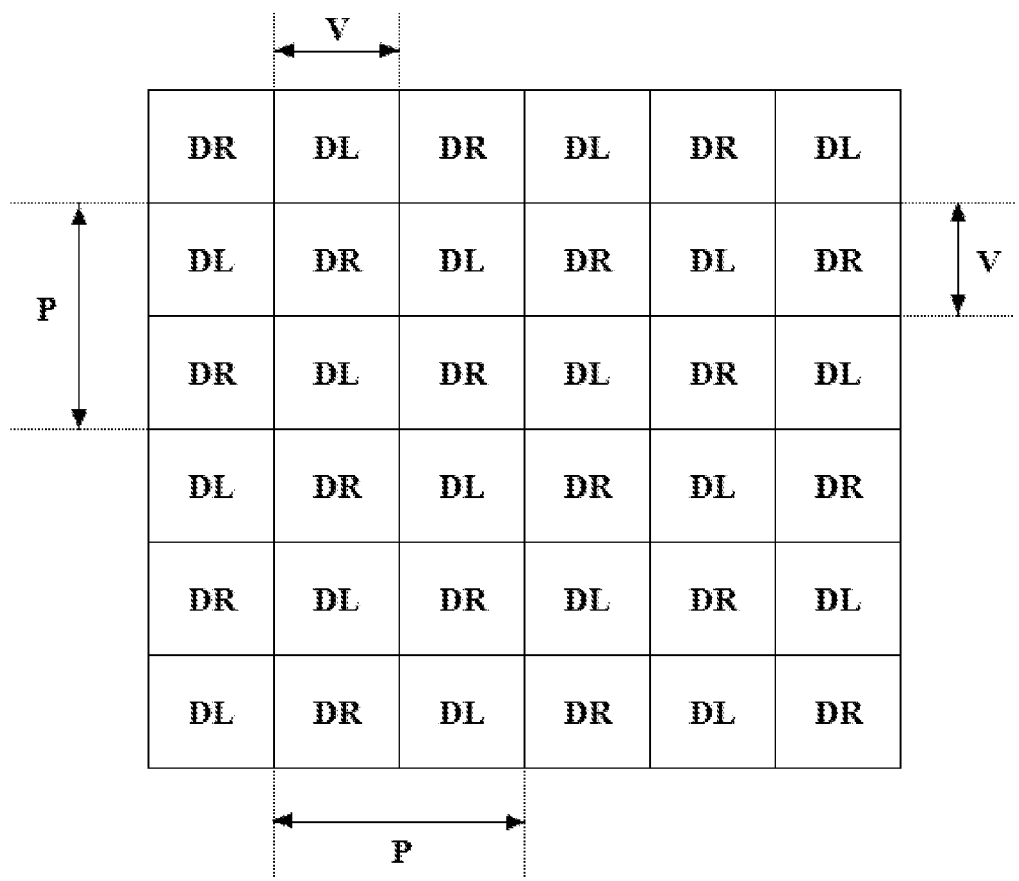
Figure 6:
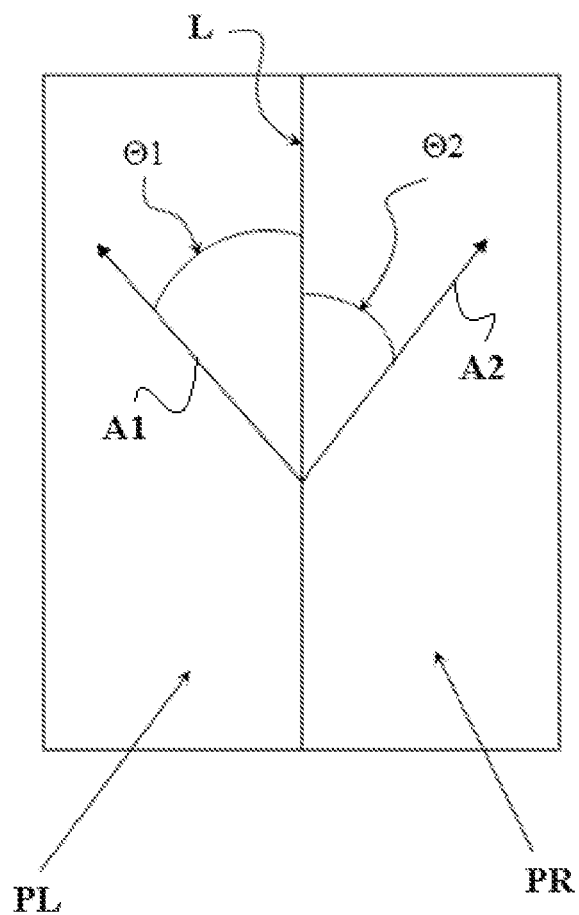
FIG. 6 is a schematic diagram illustrating optical axes in PR and PL regions.
Figure 7:
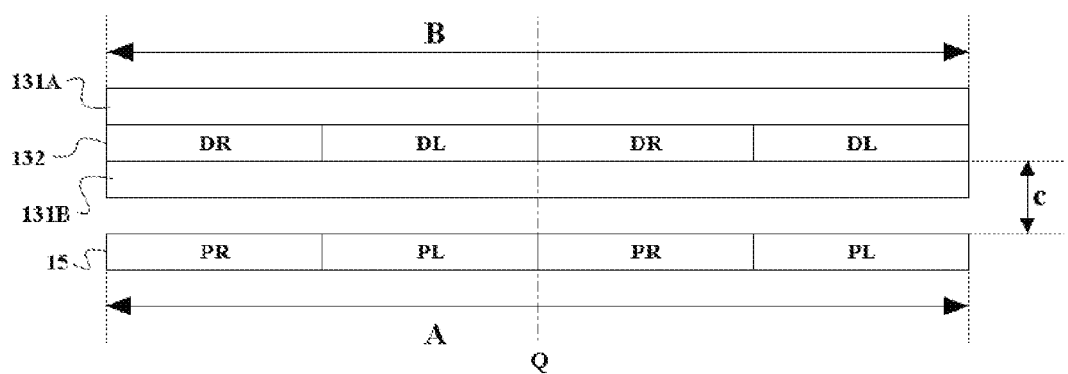
FIGS. 7 and 8 are schematic diagrams illustrating an exemplary relationship between a display device and an optical filter.
Figure 8:
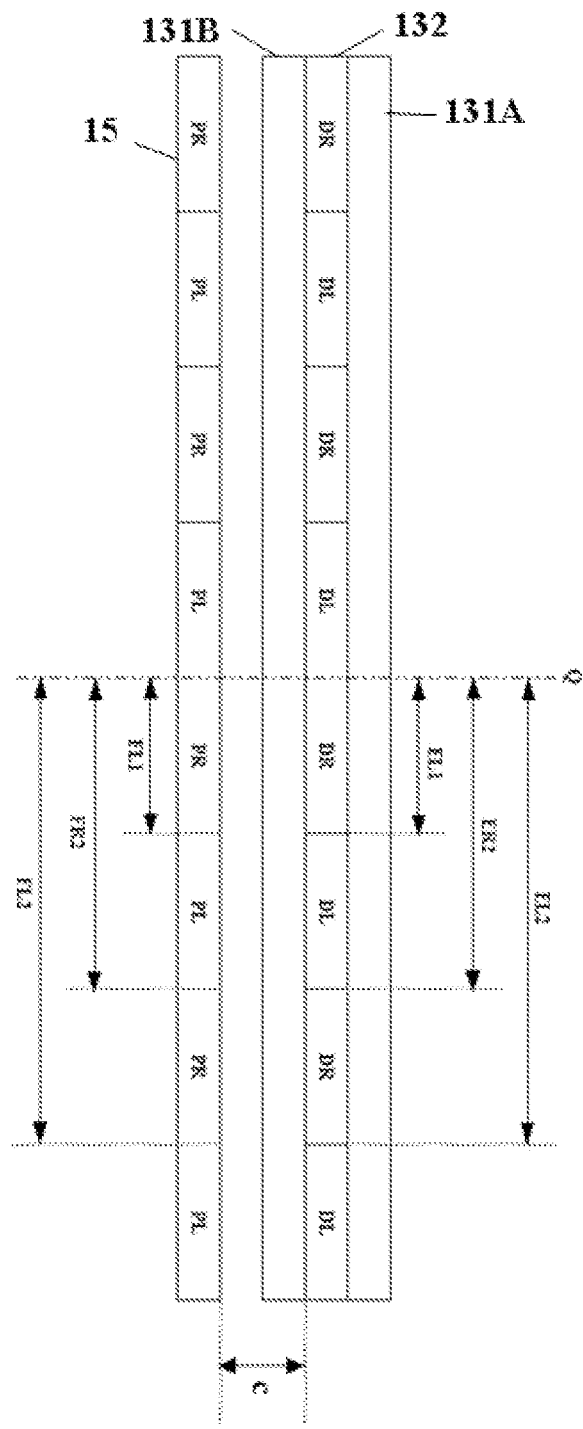

As a stereoscopic image display device having a structure shown in FIG. 1, a display device in which an absorption axis of a first polarizing plate (14 of FIG. 1) is substantially horizontal to a line bisecting the angle formed by the optical axes in first and second polarization modulating regions PL and PR in an optical filter 15 was designed. In the first polarization modulating region of the optical filter 15, a λ/4 wavelength layer in which a slow axis was formed to have an angle of 45 degrees in a clockwise direction with the absorption axis of the polarizing plate 14 was placed, and a λ/4 wavelength layer in which a fast axis was formed to have an angle of 45 degrees in a counter clockwise direction with the absorption axis of the polarizing plate 14 was placed in the second polarization modulating region. A crosstalk ratio was evaluated in the above-mentioned display device using the above-mentioned method, and the results are shown in Table 1.

Comparative Example 1

A device was designed in the same manner as in Example 1, except that an optical axis of a first region was perpendicular to an optical axis of a second region in an optical filter, and a line bisecting the angle formed by the optical axes had an angle of 10 degrees with an absorption axis of a first polarizing plate 14 in a clockwise direction. Then, a crosstalk ratio was evaluated.

Comparative Example 2

A device was designed in the same manner as in Example 1, except that an optical axis of a first region was perpendicular to an optical axis of a second region in an optical filter, a and line bisecting the angle formed by the optical axes had an angle of 15 degrees with an absorption axis of a first polarizing plate 14 in a clockwise direction. Then, a front crosstalk ratio was evaluated.

Comparative Example 3

A device was designed in the same manner as in Example 1, except that an optical axis of n a first region was perpendicular to an optical axis of a second region in an optical filter, and a line bisecting the angle formed by the optical axes had an angle of 20 degrees with an absorption axis of a first polarizing plate 14 in a clockwise direction. Then, a front crosstalk ratio was evaluated.

The evaluation results are shown in Table 1.

TABLE 1

| | Example 1 | Comparative Example 1 | Comparative Example 2 | Comparative Example 3 |
|---|---|---|---|---|
| Crosstalk Ratio (%) | 0.5 | 2.9 | 6.1 | 11.2 |

As shown in Table 1, in Example 1, the crosstalk ratio was approximately 0.5%. Conventionally, when the front crosstalk ratio is less than 1%, it is known that the observer can observe a stereoscopic image without dizziness or inconvenience. Considering this fact, it was confirmed that Example 1 realized an excellent stereoscopic image. On the other hand, it was confirmed that in Comparative Examples 1 to 3, the crosstalk ratios were 2.9% or more, and thus a quality of the stereoscopic image was significantly degraded.

According to the present invention, the method of manufacturing a stereoscopic image display device and the stereoscopic image display device manufactured by the method may minimize a phenomenon capable of degrading a stereoscopic image quality such as crosstalk, have wide viewing angle and excellent contrast characteristics and realize excellent quality of the stereoscopic image.

While the invention has been shown and described with reference to predetermined exemplary embodiments thereof, it will be understood by those skilled in the art that various changes in form and details may be made therein without departing from the scope of the invention as defined by the appended claims.

What is claimed is:

1. A stereoscopic image display device, comprising:
    a display element configured to generate image signals comprising image signals for left and right eyes in a driving state and then transmit the image signals to a side of an observer;
    a first polarizing plate disposed on the side to which the image signals are transmitted from the display element and having an absorption axis; and
    an optical filter that is disposed on a side to which the image signals passed through the first polarizing plate are transmitted and that has a first polarization modulating region having an optical axis formed in a first direction and a second polarization modulating region having an optical axis formed in a second direction that is different from the first direction, a bisector of the angle formed by the first direction and the second direction being perpendicular or parallel to the absorption axis of the polarizing plate.

2. The device according to claim 1, further comprising a second polarizing plate that is disposed in a side of the display element opposite to the first polarizing plate and that has an absorption axis.

3. The device according to claim 2, wherein the absorption axis of the first polarizing plate is perpendicular to the absorption axis of the second polarizing plate.

4. The device according to claim 1, wherein image signals passed through the first and second polarization modulating regions in a driving state have different polarizing states from each other.

5. The device according to claim 1, wherein one of the image signals passed through the first and second polarization modulating regions in a driving state is a left-circularly polarized image signal and the other one is a right-circularly polarized image signal.

6. The device according to claim 1, wherein the optical filter comprises a λ/4 wavelength layer disposed on both the first and second polarization modulating regions.

7. The device according to claim 1, wherein the first direction is perpendicular to the second direction.

8. The device according to claim 6, wherein the optical filter further comprises a substrate, and the λ/4 wavelength layer is formed on the substrate.

9. The device according to claim 8, wherein the substrate has a (−) C plate characteristic.

10. The device according to claim 8, wherein the substrate has a lower refractive index than the λ/4 wavelength layer.

11. The device according to claim 9, wherein the substrate has an optical axis formed perpendicular or parallel to a boundary line between the first and second polarization modulating regions or the line bisecting the angle formed by the optical axes of the first and second polarization modulating regions.

12. The device according to claim 8, wherein the substrate comprises a UV blocking agent or absorbent.

13. The device according to claim 8, wherein the substrate is a triacetyl cellulose substrate; a cyclo olefin polymer substrate; a poly(methyl methacrylate) substrate; a polycarbonate substrate; a polyethylene substrate; a polypropylene substrate; a polyvinyl alcohol substrate; a diacetyl cellulose substrate; a polyacrylate substrate; a polyethersulfone substrate; a polyetheretherketone substrate; a polyetherimide substrate; a polyethylenenaphthalate substrate, a polyethyleneterephthalate substrate, polyimide substrate, a polysulfone substrate, a polyarylate substrate or an amorphous fluorine polymer substrate.

14. The device according to claim 1, that satisfies the following General Formula 4:

$$A < B - (2/3) \times c \quad \text{[General Formula 4]}$$

wherein A is a length of the optical filter, B is a length of the display element, and c is an interval between the optical filter and the display element.

15. The device according to claim 14, that satisfies the following General Formula 5:

$$E \times (1 - (2c)/(3B)) = F \quad \text{[General Formula 5]}$$

wherein E is a distance from a central line of the display element to an image signal generating region for a right or left eye, F is a distance from a central line of the optical filter to the first or second polarization modulating region corresponding to the image signal generating region in the distance (E), B is a length of the display element, and c is an interval between the optical filter and the display element.

16. A method of manufacturing a stereoscopic image display device, comprising:
    sequentially disposing a display device configured to generate image signals comprising image signals for left and right eyes, a polarizing plate having an absorption axis and an optical filter comprising a first polarization modulating region having an optical axis in a first direction and a second polarization modulating region having an optical axis in a second direction different from the first direction so that a bisector of the angle formed by the first and second directions may be perpendicular or parallel to the absorption axis of the polarizing plate.

* * * * *